US012714229B2

(12) United States Patent
Collins

(10) Patent No.: US 12,714,229 B2
(45) **Date of Patent: *Aug. 25, 2026**

(54) SUBMERSION SYSTEM

(71) Applicant: Tenjam Associates, LLC, Baxter, MN (US)

(72) Inventor: Michael Collins, Marietta, GA (US)

( * ) Notice: Subject to any disclaimer, the term of this patent is extended or adjusted under 35 U.S.C. 154(b) by 78 days.

This patent is subject to a terminal disclaimer.

(21) Appl. No.: 18/974,825

(22) Filed: Dec. 10, 2024

(65) Prior Publication Data

US 2025/0098866 A1 Mar. 27, 2025

Related U.S. Application Data

(63) Continuation of application No. 17/975,236, filed on Oct. 27, 2022, now Pat. No. 12,167,794.

(60) Provisional application No. 63/272,833, filed on Oct. 28, 2021.

(51) Int. Cl.
*A47C 15/00* (2006.01)
*G05D 16/04* (2006.01)

(52) U.S. Cl.
CPC .......... *A47C 15/004* (2013.01); *G05D 16/04* (2013.01)

(58) Field of Classification Search
CPC .... A47C 15/004; A47C 15/006; G05D 16/04; G05D 7/00
USPC ..................... 4/496, 504; 441/129, 130, 132
See application file for complete search history.

(56) References Cited

U.S. PATENT DOCUMENTS

| | | | | |
|---|---|---|---|---|
| 4,986,781 | A * | 1/1991 | Smith | A47C 15/006 441/130 |
| 9,139,263 | B2 * | 9/2015 | Rubey | A47C 15/006 |
| 10,676,245 | B2 * | 6/2020 | Anderson | A47C 15/004 |
| 12,167,794 | B2 * | 12/2024 | Collins | A47C 15/004 |

* cited by examiner

*Primary Examiner* — Tuan N Nguyen
(74) *Attorney, Agent, or Firm* — Skaar Ulbrich Macari, P.A.

(57) ABSTRACT

An unsealed submersible furniture for at least partially submerging in a body of water. The unsealed submersible furniture comprising a hollow shell defining an interior configured to maintain an applied vacuum that simultaneously holds water while allowing water to freely flow between the interior and the body of water.

20 Claims, 8 Drawing Sheets

SUBMERSION SYSTEM

PRIORITY

The present non-provisional patent application is a continuation of U.S. patent application Ser. No. 17/975,236, filed Oct. 27, 2022, by Tenjam Associates, LLC, titled Submersion System, which application claims the benefit from U.S. Provisional Patent Application Ser. No. 63/272,833 filed on Oct. 28, 2021, the contents of which are incorporated herein in their entirety by reference.

FIELD

The present invention relates generally to submersion systems and more particularly to improved submersion systems for creating an interior vacuum in an unsealed container or object for at least partially submerging the unsealed container or object. The container or objecting comprising, but not limited to, an article of furniture in a body of water.

BACKGROUND

Submersible objects such as furniture have been available for a number of years. However, they have been plagued by numerous problems that have yet to be resolved. As discussed below, the present invention resolves the unresolved problems and provides new and improved submersion systems.

Conventional submersible furniture is typically constructed of a tubing material having holes to allow water to flow into the interior of the tubing. The problem is submersible furniture, constructed from tubing, is not exceptionally durable and is easily broken. Additionally, the conventional submersible furniture is extremely light and is prone to floating rather than remaining positioned on a floor of a body of water such as a pool, spa, or lake. As a result, users often must retrieve their furniture from deeper water, which poses a safety risk.

Other newer types of submersible furniture have attempted to resolve the issue of the furniture floating away by eliminating tubing and forming the furniture from a molding process, whereby the furniture comprises a shell and an interior. The newer conventional submersible furniture is submerged by adding weight to the furniture. Users typically add a physical (solid) weight or material, such as sand or concrete, to the furniture. Alternatively, users can add weight in the form of water placed inside a sealed interior of the furniture.

One conventional submersible furniture is the Ledge Lounger, described in U.S. Pat. No. 10,676,245 ("'245 patent"), The furniture of the '245 patent requires a user to remove one or more plugs and submerge the furniture to allow water to flow into the furniture's interior. A user must submerge the furniture until a water level in the interior of the furniture is higher than a water level outside of the furniture. Once the furniture is filled a user must reinsert the plug to prevent the water in the interior of the furniture from escaping.

The problem with the furniture taught in the '245 patent is that a user must have access to a depth of water deeper than the location where the furniture will be used. If the '245 patent furniture cannot be submerged in deeper water it cannot be filled to have a water line higher than the surrounding water. Without access to deeper water a user must have access to a hose connected to a spigot that can be brought in close proximity to the '245 furniture to fill the interior of the furniture with water. Once the furniture is filled the user must replace the plug(s).

The newer conventional submersible furniture has created new problems. In particular, the furniture is extremely heavy once filled with water, making turning over, carrying, moving, and placing the furniture exceedingly difficult. It also is extremely difficult to remove the water from the inside of the furniture. A user must lift the heavy furniture out of the water, remove the plug, and then drain the water from the inside of the furniture.

Another problem that has been encountered is the tendency of mold and algae to grow within the interior of the furniture. Because the furniture is so heavy and difficult to drain users typically leave the water in the furniture for an extended period of time. As a result, the interior becomes a breeding ground for mold and algae causing discoloration and shortening the useful life of the furniture. Additionally, if the water is then allowed to drain back into a pool or spa, the mold and algae will spread, negatively impacting the chemical balance of the pool or spa.

As can be seen above, there is still a need for a submersion system, including submersible objects and furniture, which easily adds and removes weight to an object or furniture for the purpose of reducing its buoyancy in an effort to prevent it from floating way. There is also a need for submersible objects and furniture that can be easily drained, and easily moved.

SUMMARY OF THE INVENTION

The present invention relates to improved submersion systems for submersing objects, including but not limited to, furniture, toys, and other items in a body of water (e.g., pool, spa, lake, pond, and ocean). The submersible system is configured to submerge the submersible objects at least partially. However, complete submersion is also possible. The submersion system of the present invention enables a user to easily add water to an object for the purpose reducing its buoyancy. While the present invention can be incorporated into any object, the disclosure will describe the invention with respect to furniture.

The submersion system of the present invention comprises an unsealed interior that allows the free movement of water into and out of the furniture's interior, which reduces the growth of algae and bacteria. The furniture of the present invention includes a port or valve assembly incorporated into or coupled thereto. The port or valve assembly, which can be added during the manufacturing process or post manufacturing is configured to be in fluid communication with the interior space, chamber, or void of the furniture. A fluid or water in the interior of the furniture is able to pass through the port or valve to the surrounding environment if a pressure in the furniture's interior increases (e.g., when a user sits on the furniture).

The furniture of the present invention also includes one or more openings or inlets that can remain unblocked or unsealed such that fluid communication between the interior of the furniture and the surrounding water is maintained.

The submersible furniture of the present invention comprises many different and novel configurations. One example embodiment is a single or unitary piece of submersible furniture. Another example embodiment comprises one or more interconnectable furniture modules that can be connected or coupled together. For example, the submersible furniture comprises an interconnectable chair/seat portion and leg/foot support portion. In another example embodiment, the submersible furniture comprises, one or more bases that support the submersible furniture. The bases can be integral to, or detachable from, the submersible furniture.

In yet another example embodiment, the bases are stackable on top of each other to allow a user to adjust the height of the submersible furniture. The stackable bases can be nested to or within each other. The stackable bases can also be coupled together and/or coupled to a portion of the submersible furniture.

In another example embodiment, the base or bases are configured having telescoping base sections slidably coupled together. A user can extend and retract the telescoping base segments to adjust a height of the submersible furniture.

In still another example embodiment, the submersible furniture comprises coupling features that allow a user to connect or removably couple one or more furniture modules, bases, or other accessories together. The coupling features may comprise hook and catches, posts and holes, and any other mechanism or feature that allow the coupling of furniture, furniture modules, bases, and accessories together.

The interconnectable furniture modules, bases, and accessories may include one or more holes or openings to allow a fluid to flow into and between their respective interiors. As such, the interiors or chambers of the furniture, furniture modules, bases, and accessories can be in fluid communication with each other, thereby increasing an overall interior volume of the submersible furniture. In one example embodiment, the holes or openings can be constantly open or selectively closable by a lid or cover. The lid or cover may include a biasing member, such as a spring that maintains the lid or cover in a closed position until opened by a part or portion of an interconnecting furniture module, base, or accessory.

The present invention also comprises a pump assembly that is operatively coupled to the submersible furniture for the purpose of creating a vacuum in the furniture's interior. As a user creates the interior vacuum water flows into the furniture's interior chamber through the openings or inlets. The amount of water allowed to enter the furniture's interior is determined by the user and the surrounding environment.

In one example embodiment, the pump assembly is operatively coupled to the port or valve assembly on the submersible furniture. The pump and port/valve assemblies facilitate the drawing of a fluid, such as air, out of the interior chamber of the submersible furniture. As the pump assembly draws the air out of the submersible furniture, another fluid, such as water, is drawn or pulled into the interior chamber through inlets or openings. The entering water increases the volume of water in the interior chamber, which adds additional weight to the submersible furniture.

The pump assembly can be battery operated or manually operated. Additionally, the pump assembly can be separate from or integral with the submersible furniture. The submersible furniture can also include one or more recesses or storage compartments to store or hold various objects, including the pump assembly, beverage containers, phones, and other personal items and valuables. The present invention can also include a vacuum release valve that is activated by a user to break an internal vacuum, which allows water to flow out of the interior chamber of the submersible furniture.

BRIEF DESCRIPTION OF THE DRAWINGS

FIG. 10A is a detailed view of a portion of the submersible furniture identified by dashed ellipse A of FIG. 10.

Figures 1A, 1B:
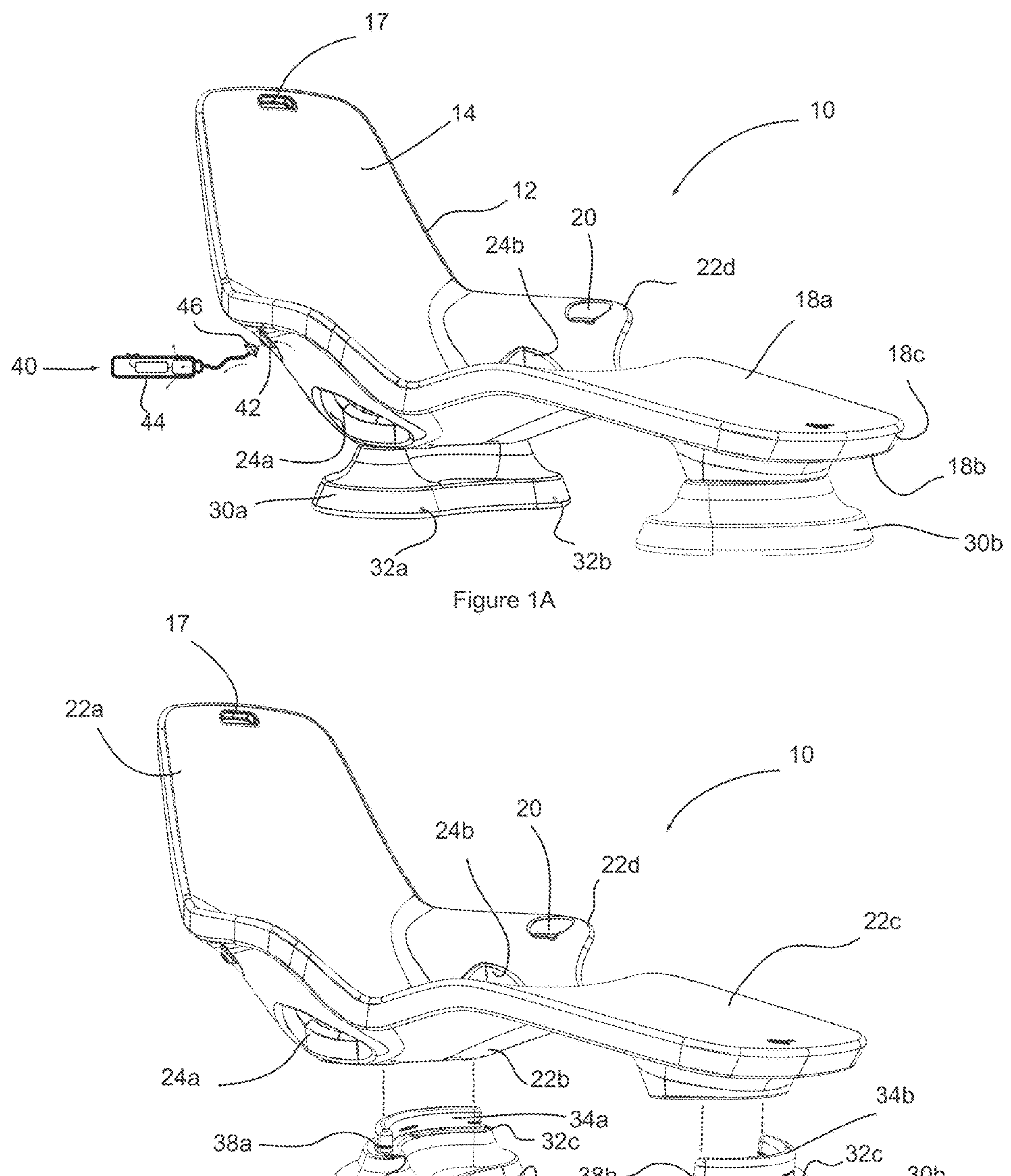
FIG. 1A is a perspective view of a submersible furniture according to an example embodiment.
FIG. 1B is a perspective view of a submersible furniture with detachable bases according to an example embodiment.
Figure 2A:
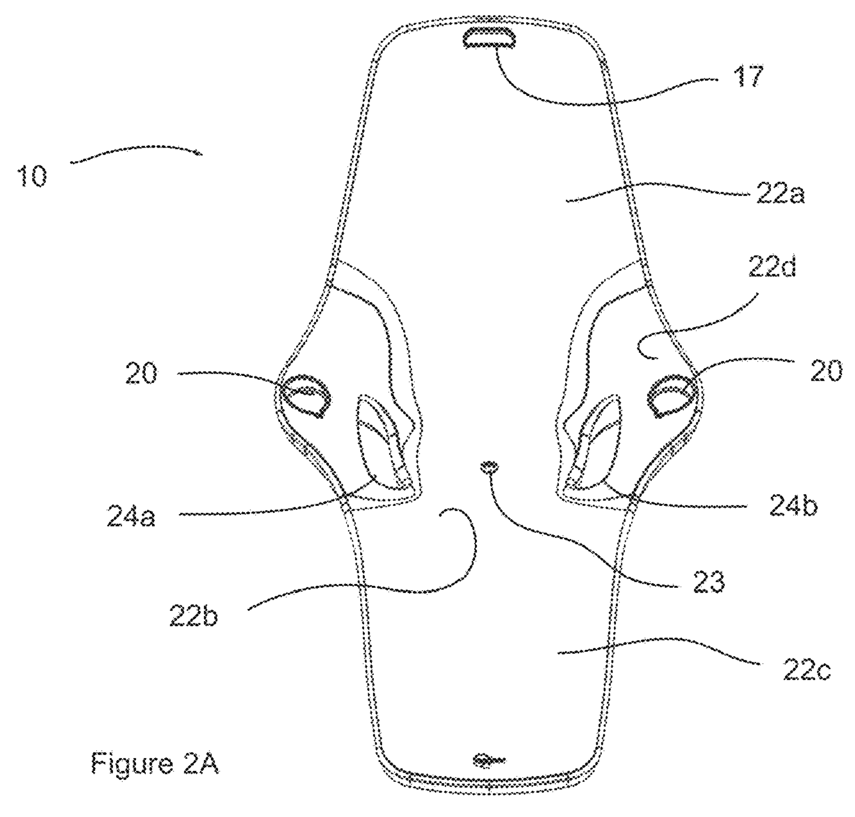
FIG. 2A is top view of a submersible furniture according to an example embodiment of the invention.
Figure 2B:
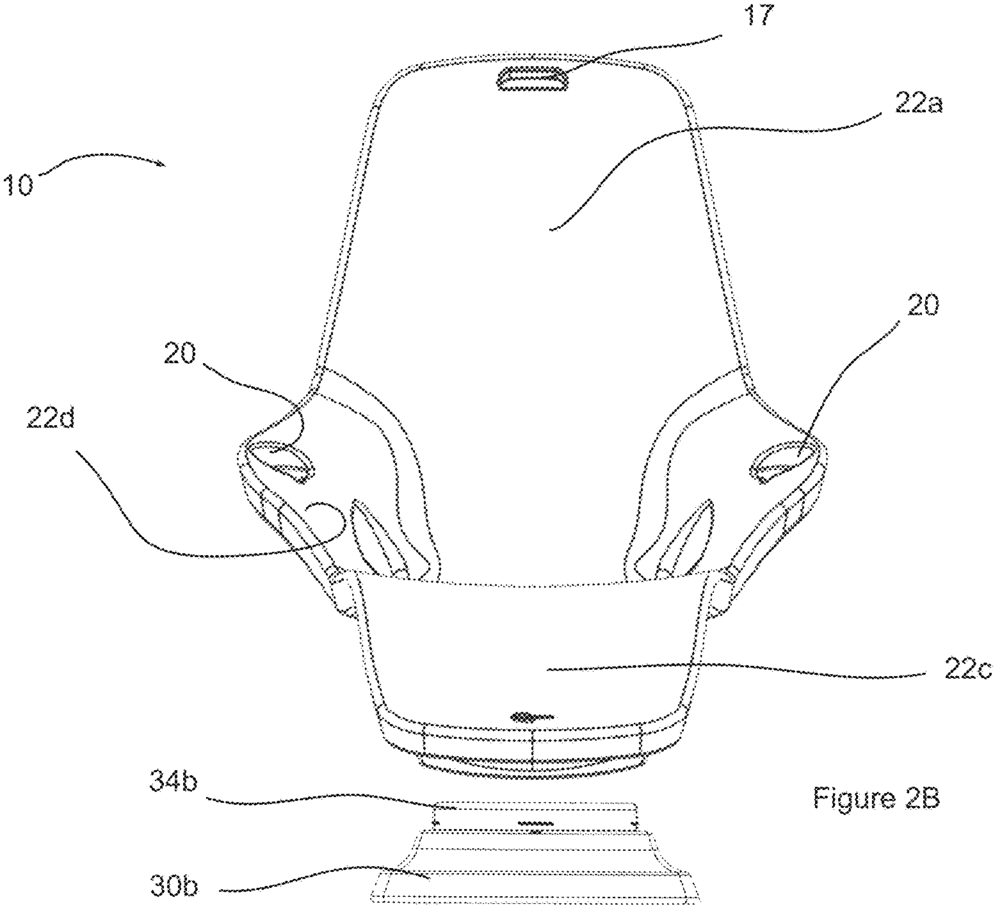
FIG. 2B is a front view of a submersible furniture with detachable bases according to an example embodiment.

While the present invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION OF THE INVENTION

The present invention, as illustrated in example FIGS. 1A-10, shall now be described in detail to provide a better understanding of its novel and innovative features. The present invention comprises a submersion system 10 for improved submersion and buoyancy control of objects, including furniture, which solves many of the problems and shortcomings of earlier submersion systems and submersible furniture. As illustrated in FIG. 1A, the submersion system 10 of the present invention comprises a piece of submersible furniture 12 having at least one interior chamber 16 that is capable of filling at least partially with a fluid when the submersible furniture 12 is at least partially submersed in a body of water, such as in a pool, spa, pond, lake, or ocean. The submersion system 10 also includes a fluid transfer or pump assembly 40 connectable to or integral with the submersible furniture 12 to transfer or draw out a fluid (e.g., air), from at least the interior chamber 16 of the submersible furniture 12 for the purpose of creating a vacuum therein. The vacuum in turn draws a fluid (e.g., water) into the furniture's interior or chamber 16.

Referring to FIGS. 1A and 1B, the example submersible furniture 12 of the present invention is illustrated as a lounge chair. However, any type of submersible furniture may be employed. The submersible furniture 12 of the present invention, regardless of type, generally comprises an outer casing 14 that at least partially encloses the interior chamber 16, which is capable of holding a fluid and being subjected to a vacuum pressure.

The submersible furniture 12 can also have one or more handles 17 that are used for moving or removing the submersible furniture 12 within or from the body of water. The handles 17 can be attached to or formed as part of the submersible furniture 12. The handles 17 can be manufactured from the same or a different material as the submersible furniture 12.

It is contemplated herein that the submersible furniture 12 can be manufactured by a number of methods including, but not limited to, rotational molding, blow molding, injection molding, and the like. Any manufacturing method capable of making a piece of at least partially submersible furniture 12, as described or contemplated herein, may be employed.

Turning back to the lounge chair example embodiment of the submersible furniture 12, the casing 14 generally comprises one or more spaced apart walls that define the interior chamber 16. The interior chamber 16 may extend across the entire inside of the submersible furniture 12 or may extend along only a portion of the inside of the submersible furniture 12. Interconnecting or spanning members may extend through the interior chamber 16 to provide structural rigidity or integrity to the submersible furniture 12.

Figure 3:
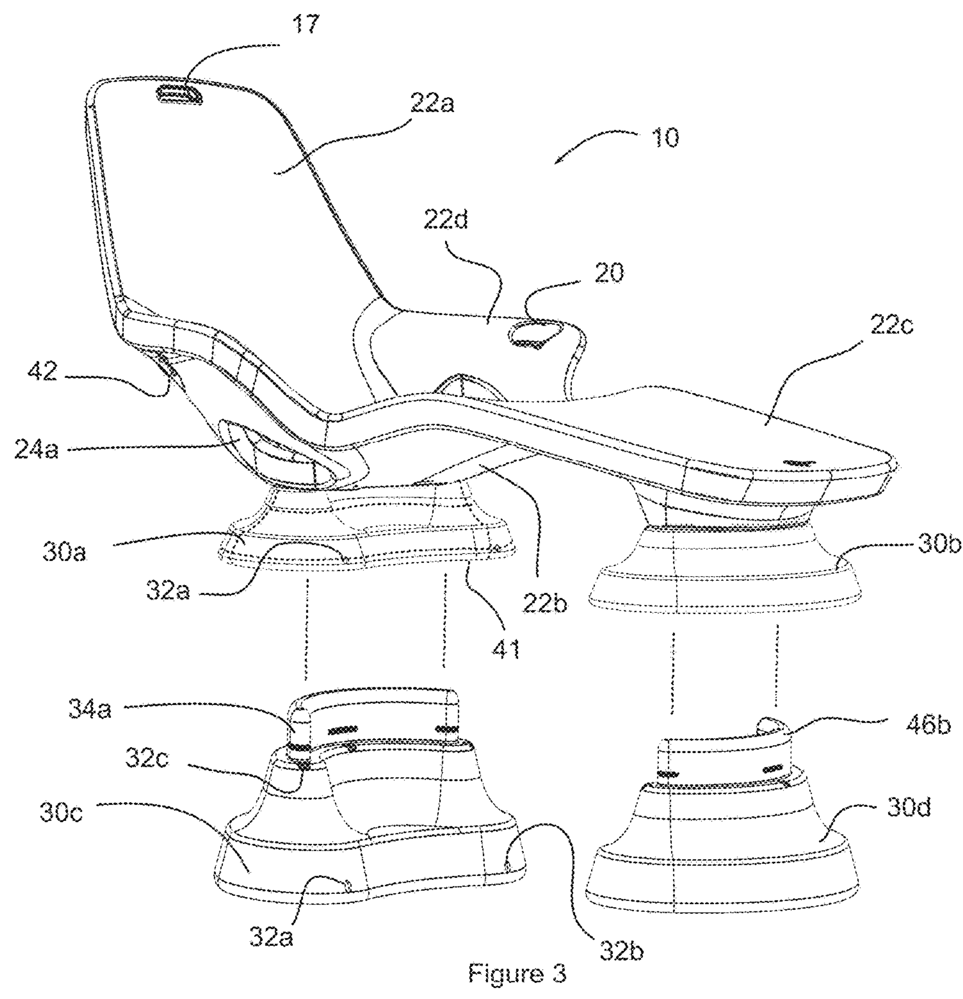
FIG. 3 is a perspective view of a submersible furniture with detachable and stackable bases according to an example embodiment.

In the example embodiment of FIGS. 1A, 1B, and 3, the submersible furniture 12 comprises at least a first wall 18*a*, a second wall 18*b*, and an intermediate or side wall 18*c* connected to and extending between the first wall 18*a* and the second wall 18*b*. The first wall 18*a*, second wall 18*b*, and intermediate or side wall 18*c* of this example embodiment define the interior chamber 16. Any number of walls may be employed. The number, shape or configuration of the walls are only subject to the particular design or shape of the submersible furniture 12.

The submersible furniture 12 also includes one or more openings or inlets 19 extending through the casing 14 or through one or more of the walls 18*a*, 18*b*, or 18*c*. The location of the inlets 19 on the submersible furniture 12 enable a flow of a fluid, such as air or water, into and out of the interior chamber 16. Once the fluid, especially in the form of a liquid, enters interior chamber 16, it acts as a weight to weigh down the submersible furniture 12. The fluid reduces the buoyancy of the submersible furniture 12, preventing it from moving, shifting, or floating away.

The submersible furniture 12 can be manufactured with a variety of features and accessories, including but not limited to storage holders or compartments 20 that may be coupled to or molded into the submersible furniture 12. For example, in FIG. 1A, the submersible furniture 12 comprises a storage holder 20 formed therein that is capable of holding a container, such as a beverage can or bottle. Other storage holders 20 can also be coupled to or formed in the submersible furniture 12, including a phone holder (which may comprise a slot) or a closable/sealable cavity having a closable lid capable of enclosing and protecting (including from moisture) a user's valuables.

Referring to the example embodiment of FIG. 1B, the submersible furniture 12 comprises a back rest portion 22*a*, a seat portion 22*b*, a foot or leg rest portion 22*c*, and arm rest portions 22*d*. As mentioned above, the submersible furniture 12 can be molded into a variety of designs and shapes. For instance, the lounge chair embodiment can be manufactured without the back rest portion 22*a*, the footrest portion 22*c*, the arm rest portion(s), or any combination thereof. Further, the submersible furniture 12 of the present invention may comprise tables, stools, chairs, beds/platforms, or any other type of submersible furniture a user may desire to place in a fluid such as water.

The submersible furniture 12 may be manufactured as individual submersible furniture modules that can be coupled together to allow a user to create or alter the submersible furniture 12 for a particular need. For example, the submersible furniture 12 may comprise a stool module that is configured to receive one or more submersible furniture modules that changes or alters the stool module. For example, other submersible furniture modules may comprise a back module, a leg module, an arm rest module, a head rest module, storage modules, and the like. In this way, a user can change the stool module into a lounge chair by adding one or more of the other submersible furniture modules.

Continuing with FIGS. 1A and 1B, the submersible furniture 12 can also comprise one or more passages 24*a* and 24*b* extending through it that allow water to pass through the submersible furniture 12. The passages 24*a* and 24 serve multiple functions including allowing water to recirculate in and out of the seat portion 22*b* thereby ensuring that the water in the seat portion 22*b* is able to be cleaned along with the other pool/spa water or replaced by fresh water as in lake, pond, or ocean. The passages 24*a* and 24*b* also allow the water passing through the seat portion 22*b* to maintain a temperature generally equivalent to a temperature of the surrounding water. The seat portion 22*b* may also include a drain hole or passage 23 extending through it. The passages 24*a*, 24*b*, and the drain hole 23, all enable the easy removal of water from the seat portion 22*b* when removing the submersible furniture 12 from the body of water.

Figure 10:
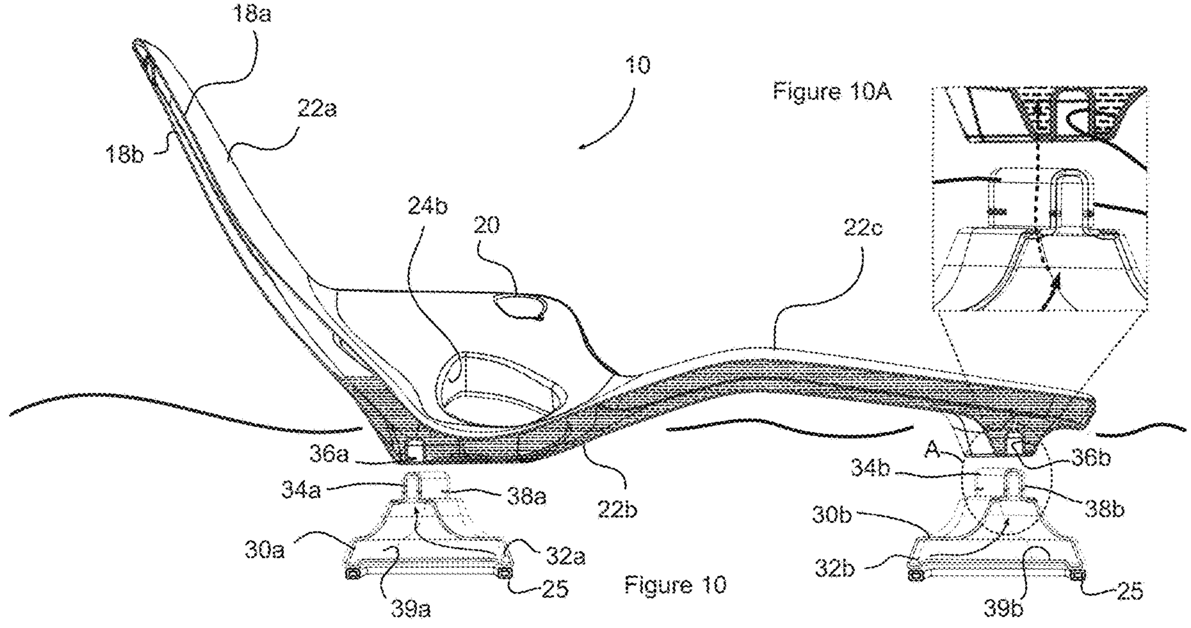
FIG. 10 is a cross section view of a submersible furniture having bases detached and positioned in a pool or spa according to an example embodiment.

In another example embodiment of the present invention, the submersible furniture 12 comprises at least one base that supports the submersible furniture 12. As illustrated in FIG. 1A, bases 30*a* and 30*b* are integral to the seat portion 22*b* and the foot and leg rest portion 22*c*, respectively. The bases 30*a* and 30*b* elevate the submersible furniture 12 above a floor of a pool, spa, pond, lake, or ocean. As illustrated in FIGS. 10, the bases 30 and 30*b* can comprise either fixed or removable feet 25 on their bottom surfaces to aid in protecting the submersible furniture 12 and a floor surface such as a pool having a vinyl liner. The feet 25 can cover the entire bottom surface or only a portion of the bottom surface of the bases 30*a* and 30*b*. The feet 25 are made of a material that will not harm a pool or spa surface, including but not limited to rubber and silicone materials.

In another example embodiment of the present invention, as illustrated in FIG. 1B, the submersible furniture 12 and the bases 30*a* and 30*b* are not integral. In this embodiment the submersible furniture 12 rests upon or is coupled to the bases 30*a* and 30*b*. The submersible furniture 12 and the bases 30 and 30*b* comprise mating or coupling features that mate or interlock together to prevent the submersible furniture 12 from sliding or falling off of the bases 30*a* and 30*b*. The mating features may comprise tongue and groove features, landed scarf tongue and groove features, posts and sockets, lip and groove features, ball and socket features, and the like.

The submersible furniture 12 and the bases 30*a* and 30*b* may be detachably coupled together for a more secure connection. As illustrated in FIGS. 1B, 3, and 10, each of the bases 30*a* and 30*b* include a rib portion 34*a* and 34*b*, respectively that fit into or mate with respective grooves 36*a* and 36*b* formed into the submersible furniture 12. Alternatively, the submersible furniture 12 may have one or more rib portions that fit into grooves formed in each of the bases 30*a* and 30*b*. By having detachable bases 30*a* and 30*b*, a user is more easily able to move the submersible furniture 12 within or out of a body of water. A similar coupling configuration may also be employed with when coupling together the submersible furniture modules.

Each of the rib portions 34*a* and 34*b*, include one or more retaining members 38*a* and 38*b* that are configured to aid in the retaining or coupling the base members 30*a* and 30*b* to the submersible furniture 12. In one example embodiment, the retaining members 38*a* and 38*b* comprise one or more gaskets or seals that aid in retaining the base members 30*a* and 30*b*, and the submersible furniture 12 together. The retaining members 38*a* and 38*b* also seal a union between the rib portions 34*a* and 34*b* and the submersible furniture 12.

The retaining members 38*a* and 38*b* can be positioned in a channel or recess 37 that extends into a surface of each of the rib portions 34*a* and 34*b*. The channel or recess 37 aids in preventing movement of the retaining members 38*a* and 38*b*. Alternatively, the retaining members 38*a* and 38*b* can be attached to at least a portion of the surface each of the rib portions 34*a* and 34*b*. The retaining members 38*a* and 38*b* are configured to engage or contact an inner surface 35*a* of the respective grooves 36*a* and 36*b*. The retaining members 38*a* and 38*b* may also contact or rest in a channel or recess extending into an inner surface of each of the respective grooves 36*a* and 36*b*.

Retaining members 38*a* and 38*b* may comprise any generally compressible material such as a rubber or silicone material. The retaining members 38*a* and 38*b* may also be replaceable allowing a user to replace worn or damaged retaining members 38*a* and 38*b*.

Figure 6A:
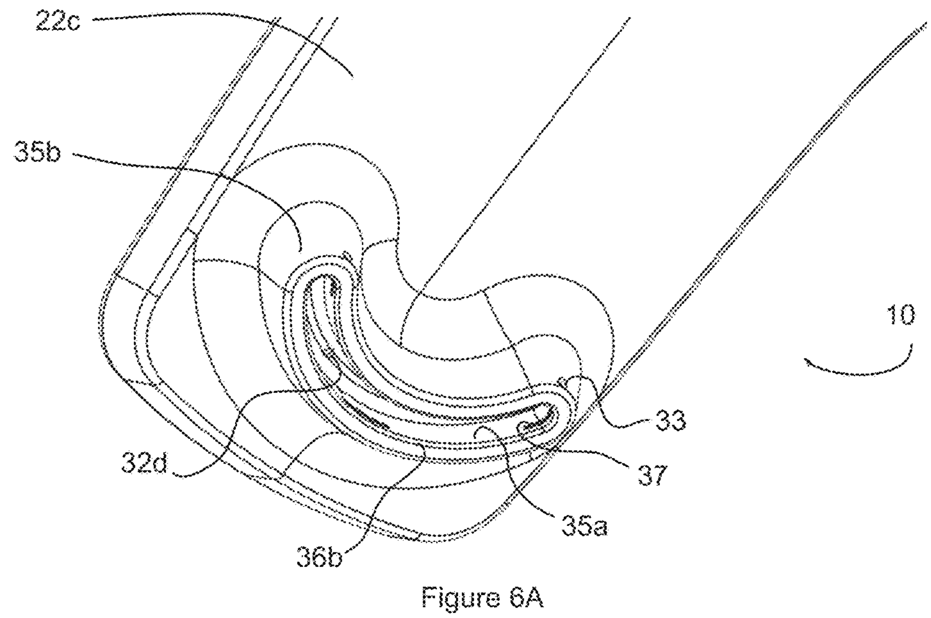
FIG. 6A is perspective view of a submersible furniture with a foot base detached according to an example embodiment.
Figure 6B:
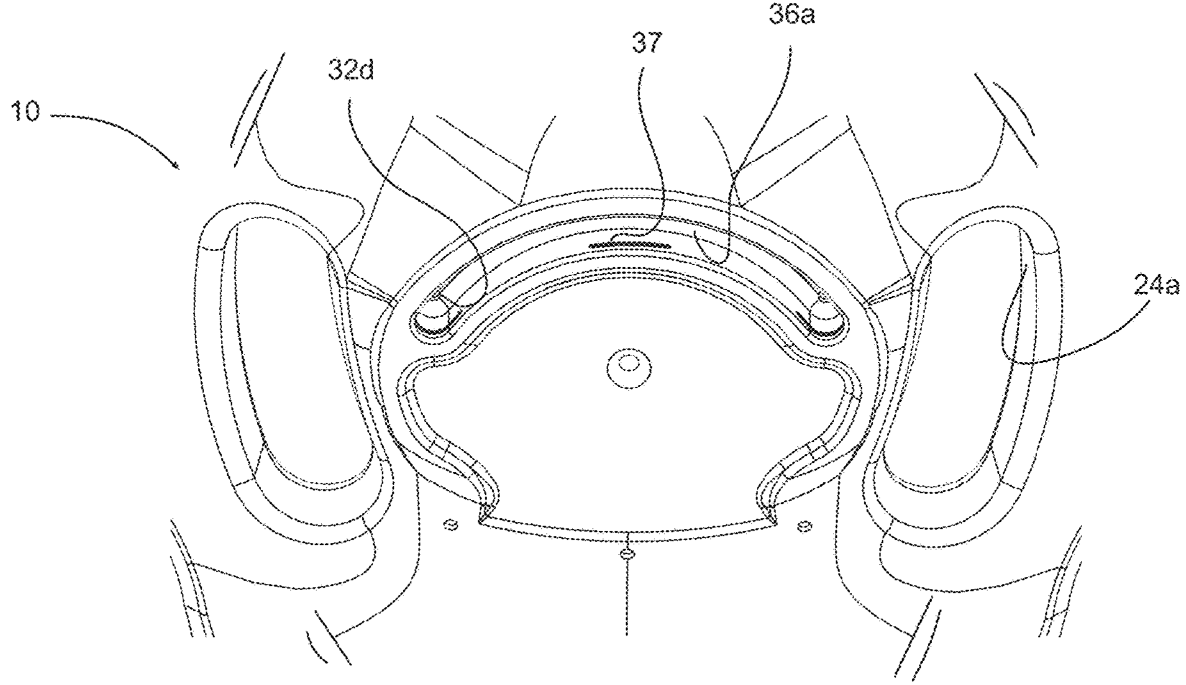
FIG. 6B is a perspective view of a submersible furniture with a seat base detached according to an example embodiment.
Figures 7A, 7B:
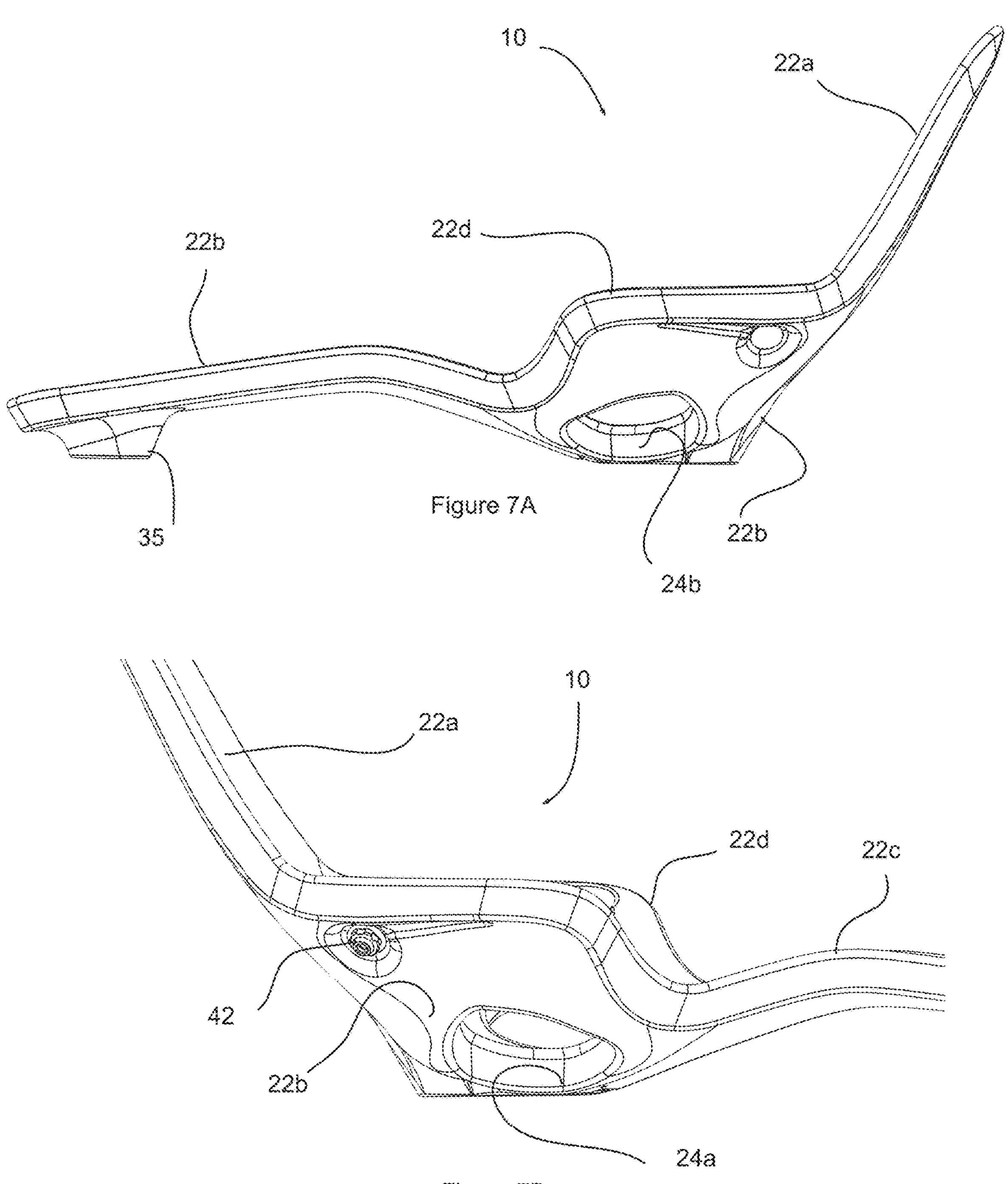
FIG. 7A is a left side view of a submersible furniture with bases detached according to an example embodiment of the invention.
FIG. 7B is a right-side view of a submersible furniture with bases detached and illustrating a valve port according to an example embodiment of the invention.

In another example embodiment of the invention, the retaining members 38*a* and 38*b* comprise lips or ribs integrally formed from the material of the bases 30*a* and 30*b* or submersible furniture 12. Similar to the replaceable retaining members 38*a* and 38*b*, the integral lips or ribs may act as a friction fit between the bases 30*a* and 30*b*, and the submersible furniture 12. The lips may also be removably inserted into channels 37 formed within the inner surface 35*a* of the grooves 36*a* and 36*b*, as illustrated in FIG. 6A.

In yet another example embodiment of the present invention, as illustrated in FIG. 1B, the retaining members 38*a* and 38*b*, whether gaskets or integral lips, may comprise spaced apart segments. The spaced apart segments of the retaining members or lips 38*a* and 38*b* may operatively communicate with respective gaskets or channels positioned or formed in the grooves 36*a* and 36*b*.

The bases 30*a* and 30*b* can also be configured to add additional weight to the submersible furniture 12. In one example embodiment, as illustrated in FIGS. 10 and 10A, the interior chamber 16 of the submersible furniture 12 is in fluid communication with interiors 39*a* and 39*b* of the respective bases 30*a* and 30*b*. Having the submersible furniture 12 and bases 30*a* and 30*b* in fluid communication increases an overall inner volume that can hold more water thereby increasing the weight and reducing the buoyancy of the submersible furniture 12.

For integral bases 30*a* and 30*b*, as discussed above and as illustrated in FIG. 1A, holes 32*a* and 32*b* are formed into the bases 30*a* and 30*b* to permit water to flow into and out of their interiors 39*a* and 39*b*. For non-integral bases 30*a* and 30*b*, as discussed above and as illustrated in FIGS. 1B and 6A, one or more additional top holes 32*c* are provided that extend into a top portion of the respective bases 30*a* and 30*b*. The top holes 32*c* are aligned with or in register with groove holes 32*d* positioned in the grooves 36*a* and 36*b* of the furniture 12. The holes 32*a*, 32*b*, top holes 32*c*, and groove holes 32*d* allow water to flow into, out of, and between the interiors 39*a* and 39*b* of the bases 30*a* and 30*b*, and the interior chamber 16 of the submersible furniture 12.

Continuing with FIG. 6A, one or both grooves 36*a* and 36*b* may be formed by a peripheral wall extending away from an outer surface of the bottom or second wall 18*b* of the submersible furniture 12. An outer surface 35*b* of the peripheral wall(s) can include one or more apertures 33 that are in fluid communication with the interior chamber 16.

While multiple bases, holes, and apertures are illustrated, it is contemplated herein that a single base, or a single hole or aperture may be utilized and should be considered to be within the scope and spirit of the invention.

In another example embodiment of the present invention, the submersible furniture 12 is adjustable to allow a user to vary a height of the submersible furniture 12 for use in or out of the water. The adjustability is accomplished in a number of ways. In one embodiment, the bases 30*a* and 30*b* are manufactured having different heights. In another embodiment, the bases 30*a* and 30*b* are telescopically coupled to the submersible furniture 12.

If a user finds that the submersible furniture 12 is not ideally positioned in the water, they may exchange the bases 30*a* and 30*b* to ones that are either taller or shorter. Alternatively, a user can adjust the submersible furniture 12 height by lifting the submersible furniture 12 up or away from the bases 30*a* and 30*b*, thereby causing the bases 30*a* and 30*b* to lengthen by a telescoping action. The submersible furniture 12 can be lowered in a similar fashion. A locking feature can be used or incorporated into the submersible furniture 12 or the bases 30*a* and 30*b* to control the removal or telescoping adjustment of the bases 30*a* and 30*b*.

In yet another example embodiment, as also illustrated in FIG. 3, the present invention comprises stackable bases 30*c* and 30*d* that can be removably coupled or stacked together to adjust the height of the submersible furniture 12. The bases 30*a* and 30*b* (integral or non-integral) can comprise contoured bottom cavities 41 (illustrated by the broken lines of FIG. 3) that are configured to receive the shape of stackable bases 30*c* and 30*d*. A user may use bases of varying height to adjust for various contours of a pool, lake, or ocean bottom. The holes 32*a*, 32*b*, and top holes 32*c*, are all manufactured to be in register or aligned to each other to allow the liquid or water to flow through the various bases 30*a*, 30*b*, through the groove holes 32*d* of the submersible furniture 12, and into the interior chamber 16.

As mentioned above, the present invention also comprises a fluid transfer assembly 40 that is used to add more fluid to at least the interior chamber 16 of the submersible furniture 12 for the purpose of adding additional weight. Referring to FIG. 1A, the fluid transfer assembly 40 comprises one or more port or valve assemblies 42 coupled to or formed in the submersible furniture 12. The port or valve assembly 42 can be recessed into the submersible furniture 12 to reduce or eliminate its visibility. The port or valve assembly 42 can also be selectively hidden by a lid or latch pivotally, slidably, or threadedly coupled to the submersible furniture 12.

The fluid transfer assembly 40 also comprises a pump or fluid actuator 44 that is configured to be coupled to the port assembly 42 to draw air out of or into at least the interior chamber 16. When a fluid such as air is drawn out of the interior chamber 16 it creates an internal vacuum inside the submersible furniture 12 that resists a net leakage or net loss of fluid, such as water, out of the interior chamber 16. In this manner, a user can add weight to the furniture 12 by drawing air out of the interior chamber 16, which in turn causes water to flow into the interior chamber 16. Additionally, the internal vacuum maintains the volume of water drawn into the interior chamber 16 while allowing the free flow or movement of water into and out of the furniture's interior.

Figure 8A:
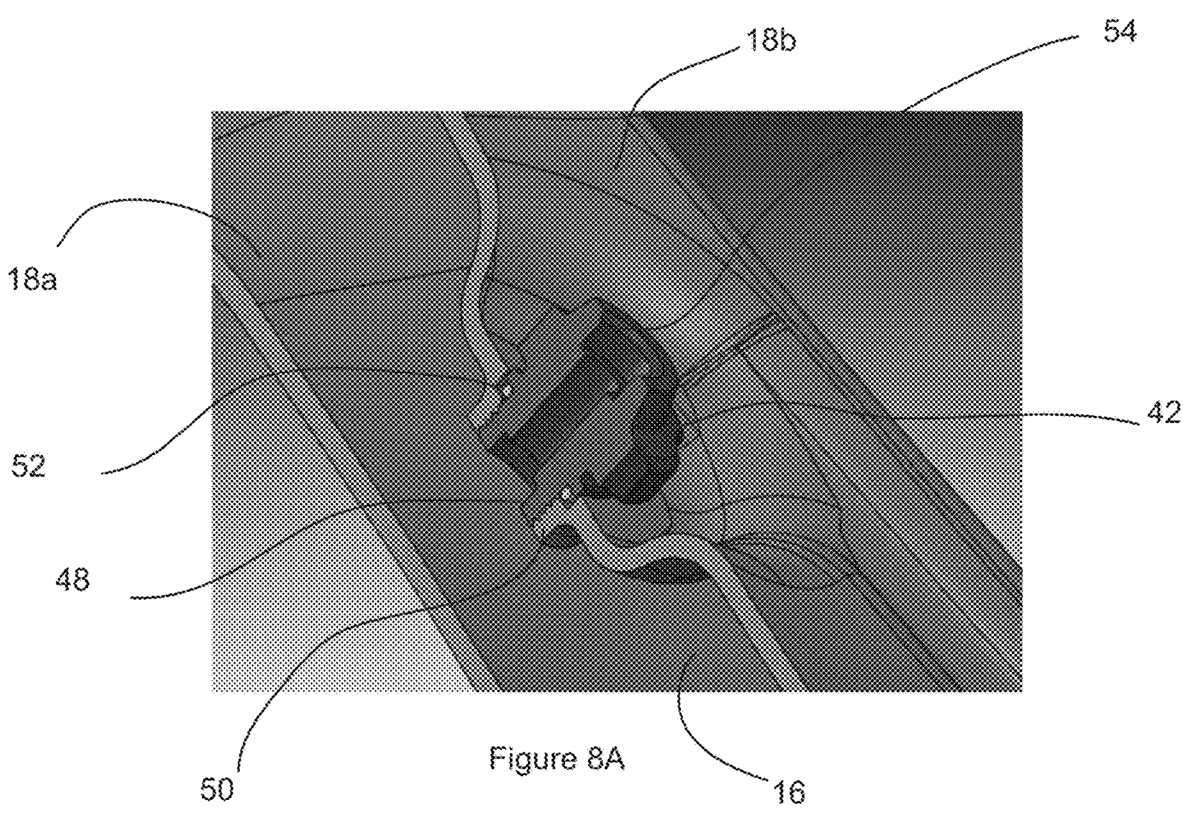
FIG. 8A is cross sectional view of the valve port according to an example embodiment of the invention.
Figure 8B:
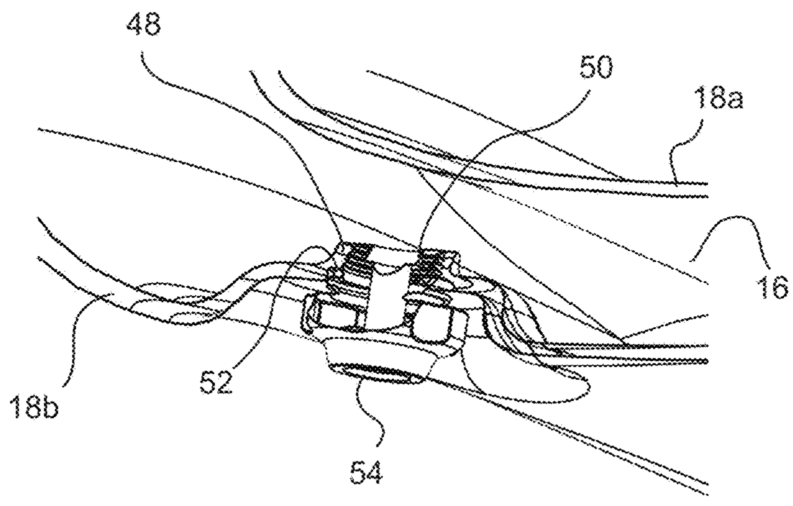
FIG. 8B is cross sectional view of the valve port according to an example embodiment of the invention.

Various ports or valve assemblies 42 and pumps 44 can be used in conjunction with the submersible furniture 12 and submersible furniture modules. For example, as illustrated in FIGS. 8A and 8B, the port or valve assembly 42 may comprise a one-way or to two-way valve having a threaded stem 48 that can be removably threaded with a threaded collar 50 formed in the casing 14 of the submersible furniture 12. A sealing member or gasket 52 is positioned or positionable between the port or valve assembly 42 and the submersible furniture 12 to seal and prevent an intrusion of air back into the interior chamber 16 once an interior vacuum is created. The port or valve assembly 42 may also comprise an orifice 54 extending through it which may house the valve. The orifice 54 forms a selective or controllable passage into the interior chamber 16 of the submersible furniture 12.

In one example embodiment, the pump 44 comprises a coupler 46 directly connected to a housing of the pump 44 or coupled to a hose extending to and coupled to the housing of the pump 44. The coupler 46 can be removably coupled, for example by threading to a portion of the port or valve assembly 42. The coupler 46 is able to create or form a seal with the port or valve assembly 42 while removing a fluid (e.g., air) from the submersible furniture 12. The pump 12 can be manual or battery operated.

Figure 9:
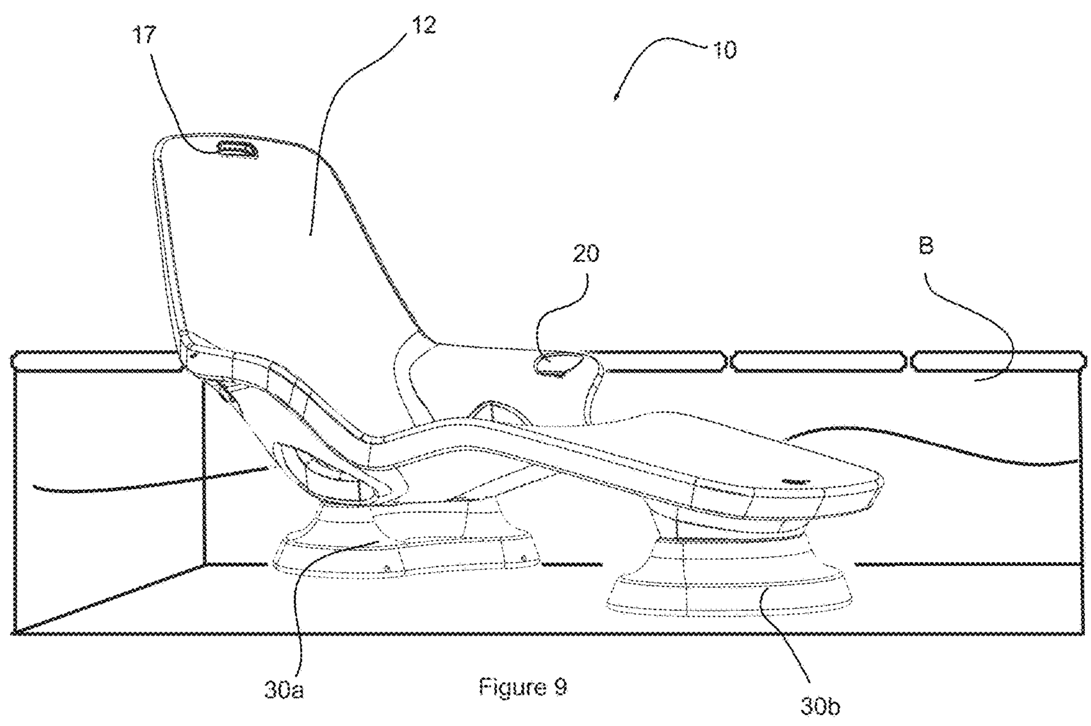
FIG. 9 is a perspective view of a submersible furniture having bases attached and positioned in a pool or spa according to an example embodiment.

In use, as illustrated in FIGS. 9 and 10, the submersible furniture 12 is placed into a body of water, such as a pool identified by the letter B. Once placed in the pool B the inlets or openings 19 begin to allow pool water to flow into the interior chamber 16 of the submersible furniture 12 (see cross section of FIGS. 10 and 10A). The inlets 19 are ideally located on a lower surface of the submersible furniture 12 or in a location that is usually below a water level of the pool.

The furniture 12 may also include other holes, outlets or vents that passively, or actively, allow air in the interior chamber 16 to escape as water begins to flow into the inlets 19. The vents are ideally located on an upper surface of the submersible furniture 12 that is typically above a water level of a pool.

Due to atmospheric pressures inside and outside of the submersible furniture 12, the water can passively enter the inlets 19 and begin to fill the interior chamber 16. As the interior chamber 16 fills with water, air is expelled out of the vents. The water will continue to flow into the interior chamber 16 until the inside and outside atmospheric pressures equalize. This is visually observed as a water level of the interior chamber 16 being equal to a water level of the surrounding body of water.

If a user finds that the submersible furniture 12 is still buoyant after the pool water passively flows into the inlets 19, the pump 44 can be used to create an interior vacuum in the interior chamber 16, which causes an increase in the volume of water in the interior chamber 16. First, the user connects the coupler 46 to the port or valve assembly 42. The pump 44 is then activated or operated, which begins to draw air from the passage in the orifice 54 of the port or valve assembly 42. The vacuum created by the pump 44 opens the valve in the port assembly 42 allowing the air to flow out of the interior chamber 16.

As the air is drawn out of the interior chamber 16, additional pool, spa, pond, lake, or ocean water is able to flow through the inlets 19 and into the interior chamber 16 of the submersible furniture 12. As particularly illustrated in FIG. 10 and as mentioned above, water can flow into the interiors 39*a* and 39*b* of bases 30*a* and 30*b* and then into the interior chamber 16 through top holes 32*c* and groove holes 32*d*. The inflowing water increases the volume of water, and correspondingly the weight, in the interior chamber 16. The flow of water is illustrated by the phantom arrow lines of FIGS. 10 and 10A. The flow of water is similar if stackable or telescoping bases 30*c* and 30*d* are used.

The vacuum created by the pump 44 is allowed to continue, drawing air out of and water into the interior chamber 16, until a desired volume or weight of water is obtained. Because of the interior vacuum, the user is able fill the interior chamber 16 above the water level of the body of water until it reaches the port 42.

Once a desired volume of water enters the interior chamber 16 the operation of the pump 44 may be stopped or switched off. Switching off the pump 44 terminates the vacuum, which causes the valve in the port assembly 42 to close. Once the valve is closed it creates an internal vacuum in the interior chamber 16. An internal vacuum may also be created in the bases 30*a*, 30*b*, 30*c*, and 30*d* if they are part of or coupled to the submersible furniture 12. The internal vacuum will maintain the volume of water in the submersible furniture 12 until it is broken. While the volume of water may remain the same, it is possible for the water to freely flow between the furniture's 12 interior 16 and the surrounding environment.

In one example embodiment of the present invention, the fluid transfer assembly 40 is integrated with the submersible furniture 12 for added convenience. The fluid transfer 40 can be configured to provide automatic cycling to insure a predetermined internal vacuum pressure in the submersible furniture 12 is maintained. Additional or periodic increases/decreases of vacuum pressure may be needed if the water level changes and the submersible furniture 12 becomes buoyant. A change in water level or depth can occur in lakes and oceans depending upon the tide. Changes in water depth can also occur in pools when the number of users changes, which causes a displacement of the pool water.

An integrated fluid transfer assembly 40 can be built into the casing 14 or a wall surface 18*a*, 18*b*, or 18*c* of the submersible furniture 12. If the fluid transfer assembly 40 is battery operated it can be sealed by a moveable or removable door, lid, cover, or hatch. A user can activate the fluid transfer assembly 40 by actuating a switch or control. The switch can include the settings, on, off, or automatic, with the automatic setting being controlled by a pressure sensor able to detect the vacuum pressure in the submersible furniture 12.

An integrated manual fluid transfer assembly 40 can also be used. The manual fluid transfer assembly 40 comprises a plunger that can take the form of a rod, piston, or bulb that is configured to be pulled, pushed, or depressed by a user, to draw or push air out of the interior chamber 16, and bases 30*a*-30*c*, thereby creating the vacuum.

If the pump assembly 40 is not integrated with the submersible furniture 12, it can be coupled to the port or valve assembly 42 to increase a volume of water in the chamber 16. For example, as illustrated in FIG. 1A, the coupler 46 can be placed over the port or valve assembly 42 or inserted into orifice 54. Similar to the integrated pump assembly 40, the non-integrated fluid transfer assembly 40 can be operated manually or by a battery powered motor to create a vacuum that pulls open the port or valve assembly 42 valve and draws water into the interior chamber 16. Once a desired volume of water has entered the interior chamber 16, a user stops the fluid transfer assembly 40, which terminates the vacuum and causes the port or valve assembly 42 valve to close. Once the port or valve assembly 42 valve closes an internal vacuum pressure is maintained in the interior chamber 16, which maintains the volume of water in the interior chamber 16. The fluid transfer assembly 40 can then be removed from the port or valve assembly 42.

Figure 4:
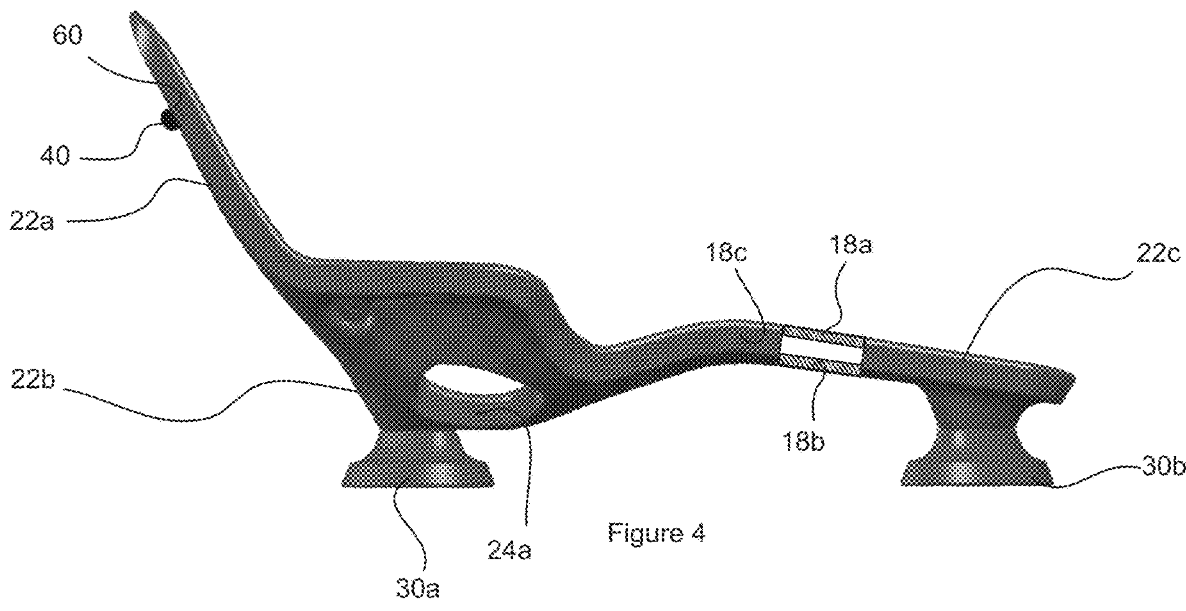
FIG. 4 is a side view of a submersible furniture with detachable and stackable bases according to an example embodiment.
Figures 5A, 5B:
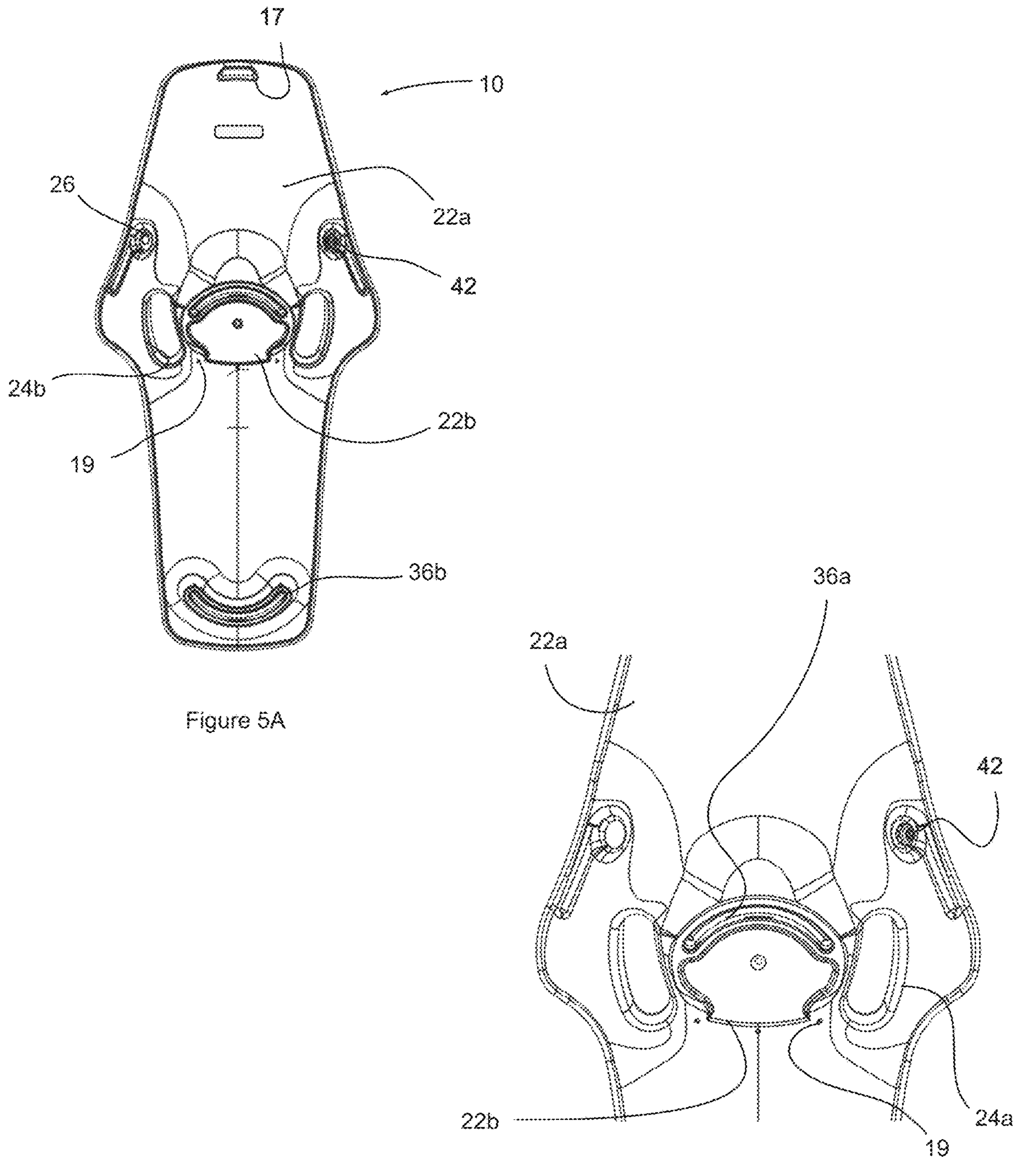
FIG. 5A is a bottom view of a submersible furniture with bases detached according to an example embodiment.
FIG. 5B is a bottom detailed view of a submersible furniture with bases detached according to an example embodiment.

In one example embodiment of the present invention, as illustrated in FIG. 4, the submersible furniture 12 may comprise one or more recesses 60 that are configured to hold or store the pump assembly 40 when not in use. In one embodiment, the recesses 60 can be molded into or attached to a back or lower surface of the submersible furniture 12 so as to not interfere with the enjoyment of the submersible furniture 12.

In another embodiment of the invention, one or more internal baffles may be molded into the submersible furniture 12 to provide support, to provide one or more air passages for the movement of air within the interior chamber 16, or a combination of the two. In this embodiment, the port assembly 42 may be positioned lower on the submersible furniture 12 but in fluid communication with one or more air directing baffles that extend up to a higher or highest point or portion of the submersible furniture 12. In this way, the pump assembly 40 is able to create a vacuum that draws water into the interior chamber 16 above a location of the port assembly 42.

In addition to the above, another advantage of the present invention is that water is still able to move in and out of the interior chamber 16, and bases 30*a*-30*c* if used, while maintaining a vacuum pressure. This movement or exchange of water reduces the potential for the growth of mold and algae within the interior chamber 16 or bases 30*a*-30*c*. This is particularly important for submersible pool furniture 12 that tends to stay in a pool for longer periods of time. For example, hotels and resorts often have numerous pieces of submersible pool furniture 12 making removal of all pieces of submersible pool furniture 12 every night extremely difficult. The present invention permits the pool furniture 12 to remain in the pool as water is able to circulate through the interior chamber 16 and bases 30*a*-30*c* maintaining a chemical balance with the rest of the pool water.

If a user desires to move the submersible furniture 12 or to simply remove the submersible furniture 12 from the body of water or pool, the user only needs to release or break the vacuum in the interior chamber 16 and bases 30*a*-30*c*. The submersible furniture 12 of the present invention can comprise one or more vacuum release mechanisms 26 to allow a user to drain water from the interior chamber 16 and bases 30*a*-30*c*, thereby lessening the weight of the submersible furniture 12. In one embodiment, a user simply turns or rotates a portion of the port assembly 42 (such as a cap) causing a vacuum seal to be broken and air to enter the interior chamber 16 and bases 30*a*-30*c*. In another embodiment, a user can depress a pressure release valve 26 built into the casing 14 or a wall of the submersible furniture 12. The pressure release valve 26 allows air to flow into the interior chamber 16 and bases 30*a*-30*c* breaking the vacuum. Lastly, a user can simply lift a portion of the submersible furniture 12 up until one or more inlets 19 or other holes, openings, or apertures are lifted out of the water breaking the vacuum and allowing air to flow into the interior chamber 16 and bases 30*a*-30*c*.

Once the water has been drained from the submersible furniture 12, it becomes significantly lighter allowing a user to more easily move it around or to remove it from the body of water.

While a lounge chair has been described in detail as the submersible furniture 12, it should not be considered limiting. The submersible furniture 12 of the present invention can comprise any chair, stool, table, platform, gaming table, sports furniture, and the like.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An unsealed submersible furniture for at least partially submerging in a body of water, the submersible furniture comprising:

a casing defining an interior configured to receive a fluid, the casing having at least one inlet extending through the casing and into the interior; and a pump operatively coupled to a portion of the casing, the pump being configured to draw a fluid out of the interior of the casing creating an interior vacuum therein that draws water through the at least one inlet and into the interior of the casing;

wherein water is able to freely flow through the interior of the casing to prevent it from becoming stagnant.

2. The submersible furniture of claim 1, further comprising a valve assembly coupled to the casing and configured to control a flow of fluid into the interior of the casing; wherein the valve assembly comprises a one-way valve configured to automatically open upon an increase in pressure in the interior of the casing.

3. The submersible furniture of claim 2, wherein the valve assembly is removably coupled to the casing.

4. The submersible furniture of claim 1, further comprising a valve assembly coupled to the casing and configured to mate with the pump to control a flow of fluid into the interior of the casing.

5. The submersible furniture of claim 4; wherein the valve assembly comprises a one-way valve configured to automatically open upon an increase in pressure in the interior of the casing.

6. The submersible furniture of claim 1 further comprising an adjustable base attachable to a bottom of the casing.

7. The submersible furniture of claim 6, wherein the adjustable base comprises an interior and at least one hole extending therein that is in fluid communication with at least one hole extending through the casing, wherein the interior of the base and the interior of the casing are in fluid communication.

8. The submersible furniture of claim 7, wherein the adjustable base comprises a plurality of stackable bases removably connectable, wherein the interior of each of the stackable bases are in fluid communication with the interior of the casing.

9. The submersible furniture of claim 6, wherein the adjustable base comprises a plurality of base segments that are telescopically coupled together.

10. A portable unsealed submersible furniture for at least partially submerging in a body of water, the portable unsealed submersible furniture comprising:

a hollow shell molded in the shape of a piece of furniture and defining an interior, the hollow shell having at least one hole and at least one water inlet extending therethrough and defining a passage to the interior;

a valve assembly having a one-way valve positionable in the hole in the hollow shell to control a fluid flowing into and out of the interior of the hollow shell; and a pump mateable with the valve assembly and configured to open the one-way valve;

wherein operation of the pump draws air from the interior of the hollow shell creating a vacuum that draws water through the at least one inlet and into the interior of the hollow shell;

wherein water is able to freely flow through the interior of the hollow shell to prevent it from becoming stagnant.

11. The portable unsealed submersible furniture of claim 10, wherein the hollow shell comprises a plurality of detachable portions having interconnected interiors in fluid communication.

12. The portable unsealed submersible furniture of claim 11, wherein the plurality of detachable portions comprises a base attachable to a bottom of the hollow shell, the base having at least one hole extending through it enabling the interior of the base and the interior of the hollow shell to be in fluid communication.

13. The portable unsealed submersible furniture of claim 11, wherein the plurality of detachable portions includes a seat portion and a back portion in fluid communication.

14. The portable unsealed submersible furniture of claim 11, wherein the plurality of detachable portion includes a seat portion, a back portion, and a leg portion in fluid communication.

15. The portable unsealed submersible furniture of claim 11, wherein the plurality of detachable portion includes a seat portion, a back portion, arm portions, and a leg portion in fluid communication.

16. The portable unsealed submersible furniture of claim 10, wherein the hollow shell is molded in the shape of a table.

17. The portable unsealed submersible furniture of claim 10, wherein the hollow shell is molded in the shape of a chair and a table that are connectable, the chair and table each having an interior that are in fluid communication.

18. The portable unsealed submersible furniture of claim 10, wherein the hollow shell is molded in the shape of a bar stool and bar that are connectable, the bar stool and bar each having an interior that are in fluid communication.

19. The portable unsealed submersible furniture of claim 10, further comprising a recess formed in the hollow shell to receive and hold the pump between uses.

20. The portable unsealed submersible furniture of claim 10, further comprising one or more storage compartments formed in the hollow shell to receive and hold the pump between uses.

* * * * *